(12) United States Patent
Yoshida

(10) Patent No.: US 7,245,390 B1
(45) Date of Patent: Jul. 17, 2007

(54) COMMUNICATION APPARATUS FOR RING-TYPE MULTIPLE ADDRESS TRANSMISSION/RECEPTION

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 965 days.

(21) Appl. No.: 09/617,234

(22) Filed: Jul. 14, 2000

(30) Foreign Application Priority Data

Jul. 21, 1999 (JP) ............................. 1999/206096

(51) Int. Cl.
G06D 15/00 (2006.01)
H04N 1/00 (2006.01)
H04M 11/00 (2006.01)

(52) U.S. Cl. .................. 358/1.15; 358/407; 358/438; 358/440; 358/436; 379/100.05; 379/100.09

(58) Field of Classification Search ............... 358/404, 358/403, 1.15, 1.13, 407, 438, 440, 436; 379/100, 94, 100.05, 100.09
See application file for complete search history.

(56) References Cited

U.S. PATENT DOCUMENTS

| 4,856,052 | A | * | 8/1989 | Hirato | ................... | 379/100.03 |
| 5,170,428 | A | * | 12/1992 | Watanabe et al. | ...... | 379/100.09 |
| 6,115,141 | A | * | 9/2000 | Kim | .......................... | 358/404 |
| 6,310,699 | B1 | * | 10/2001 | Kawasaki | ................... | 358/434 |

* cited by examiner

*Primary Examiner*—Douglas Q. Tran
*Assistant Examiner*—Chan S. Park
(74) *Attorney, Agent, or Firm*—Fitzpatrick, Cella, Harper & Scinto

(57) ABSTRACT

A facsimile apparatus which is easy to use is provided. Control is performed so that a CPU (central processing unit) registers a sub-address signal and a communication specification so as to correspond to a memory box, selects start of ring-type multiple-address transmission, and selects transfer of ring-type multiple-address reception. When start of ring-type multiple-address transmission has been selected, transmitter information is added. When transferring ring-type multiple-address reception, transmitter information is not added.

2 Claims, 7 Drawing Sheets

FIG.2
| MEMORY-BOX NUMBER | SUB-ADDRESS SIGNAL | COMMUNICATION SPECIFICATION |
|---|---|---|
| 01 | 1234 | TRANSFER TO ADDRESS A ACCORDING TO RING-TYPE MULTIPLE-ADDRESS TRANSMISSION NICKNAME IS PTA CIRCULAR |
| 02 | 5678 | TRANSFER TO ADDRESS B |
FIG.3A
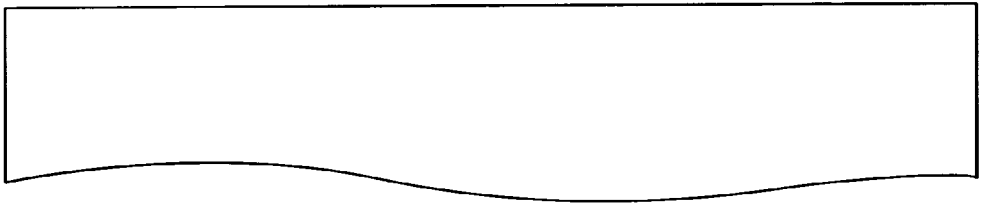
FIG.3B
FIG.3C
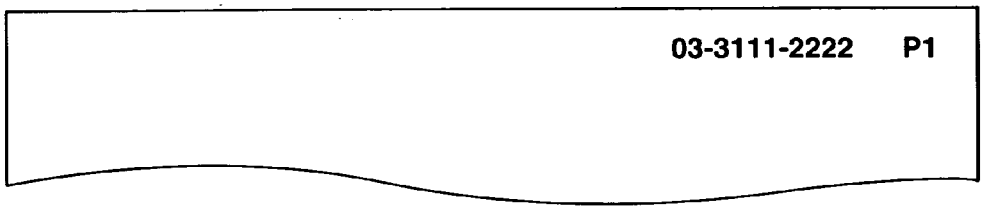

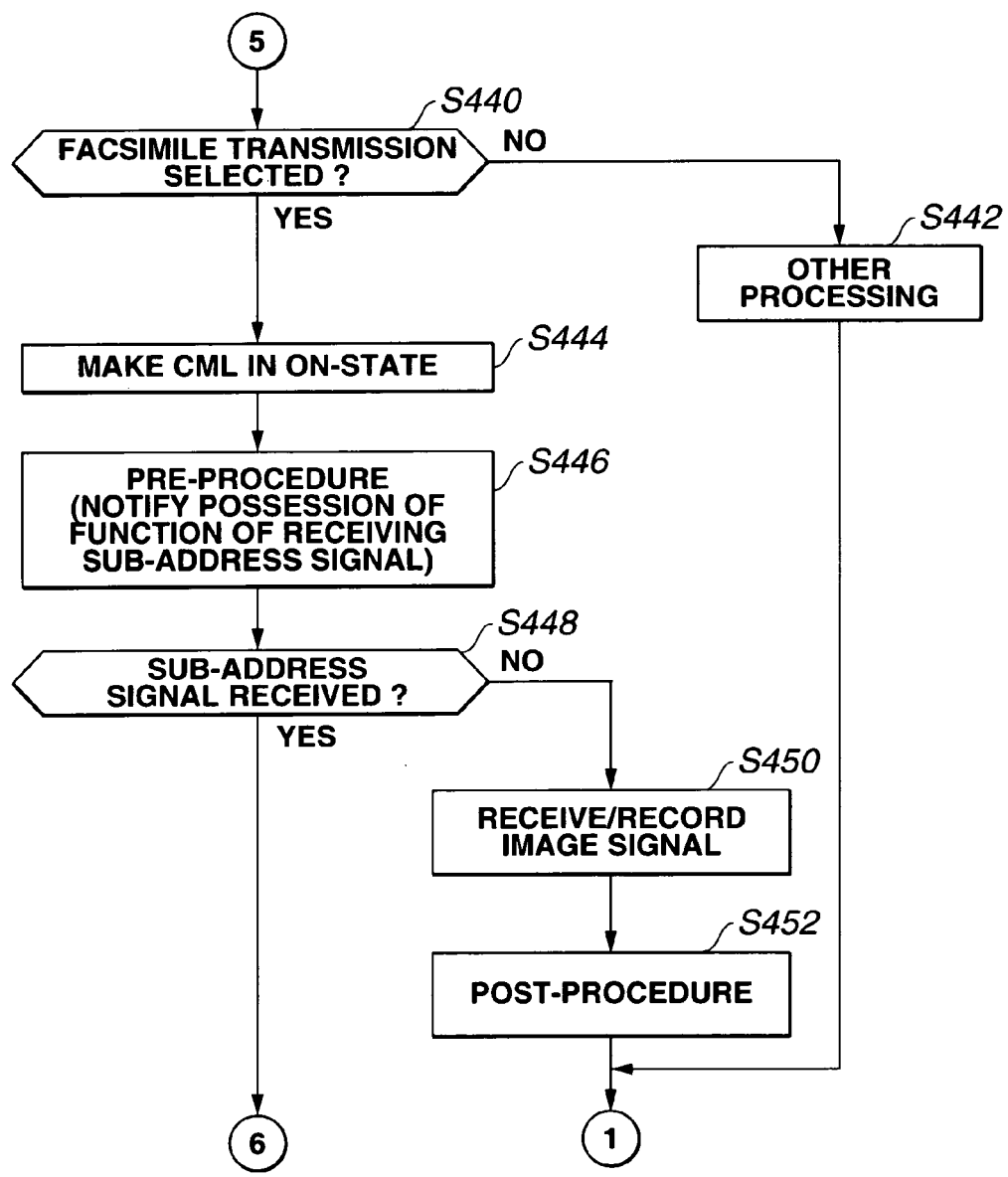

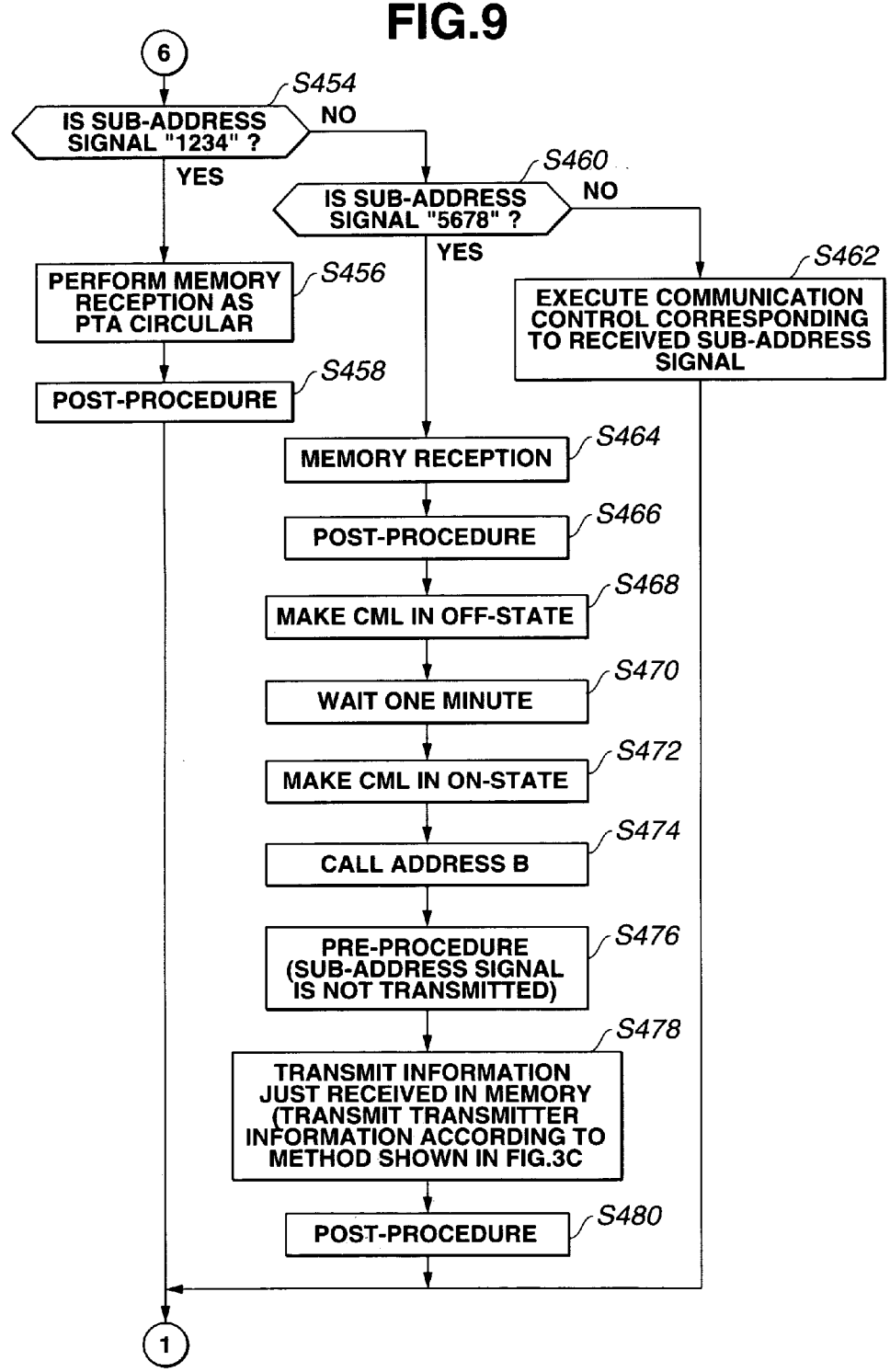

COMMUNICATION APPARATUS FOR RING-TYPE MULTIPLE ADDRESS TRANSMISSION/RECEPTION

BACKGROUND OF THE INVENTION

1. Field of the Invention

The present invention relates to a communication apparatus capable of performing ring-type multiple-address transmission.

2. Description of the Related Art

A description will now be provided of a conventional facsimile apparatus, serving as a communication apparatus capable of performing ring-type multiple-address transmission. This facsimile apparatus includes selection means for selecting whether or not transmitter information is to be transmitted in a transmission operation. When it has been selected to add the transmitter information, the transmitter information is added in any of an ordinary transmission, a memory multiple-address transmission, a memory transmission, and a transfer. On the other hand, when it has been selected not to add the transmitter information, the transmitter information is not added in any of an ordinary transmission, a memory multiple-address transmission, a memory transmission, and a transfer.

In the above-described conventional approach, however, if ring-type multiple-address transmission is executed in a state in which transmission of transmitter information is selected, for example, if transmission is executed from FAX (facsimile) A to FAX B, from FAX B to FAX C, from FAX C to FAX D, from FAX D to FAX E, and from FAX E to FAX A, when FAX E receives ring-type multiple-address reception information, information relating to four transmitters is added. If information from an original is sufficient enough to be recorded, for example, from the uppermost portion to the lowermost portion of a cut recording sheet, the received information is recorded in a state of being divided into two pages.

SUMMARY OF THE INVENTION

The present invention has been made in consideration of the above-described problems in the prior art.

It is an object of the present invention to provide a communication apparatus which can be used with ease.

According to one aspect, the present invention which achieves the above described object relates to a communication apparatus capable of performing ring-type multiple-address transmission. The apparatus includes a registration unit, arranged to register a sub-address signal and a communication specification so as to correspond to a memory box, a start selector, arranged to select a start of ring-type multiple-address transmission, a ring-type multiple-address reception transfer selector, arranged to select a transfer of ring-type multiple-address reception, and a controller arranged to perform a control operation so that, when the start of the ring-type multiple-address transmission has been selected, transmitter information is added, and when the transfer of ring-type multiple-address reception has been selected, the transmitter information is not added. The communication apparatus performs ring-type multiple-address transmission/reception of received image data; and the transmitter information is added to the received image data as image data when the start of ring-type multiple address transmission has been selected.

According to another aspect, the present invention which achieves the above-described object relates to a communication apparatus capable of performing ring-type multiple-address transmission. The apparatus includes a memory arranged to store received image data, a registration unit, arranged to register a sub-address signal and a communication specification so as to correspond to a memory box, a transfer unit arranged to transfer the received image data stored in the memory, an identification unit arranged to identify whether or not the received image data is data assigned to be subjected to ring-type multiple-address processing, and a processor for causing the transfer unit to transfer the received image data without adding transmitter information if the received image data is data assigned to be subjected to the ring-type multiple-address processing, and for causing the transfer unit to transfer the received image data with the transmitter information added thereto if the received image data is not data assigned to be subjected to ring-type multiple-address processing, wherein the transmitter information is added to the received image data as the image data.

According to yet another aspect, the present invention which achieves the above-described object relates to a communication method performing ring-type multiple-address transmission, the method including the steps of registering a sub-address signal and a communication specification so as to correspond to a memory box, selecting a start of a ring-type multiple-address transmission, selecting a transfer of a ring-type multiple-address reception, and performing a control operation so that, when the start of ring-type multiple-address transmission has been selected, transmitter information is added, and, when the transfer of ring-type multiple-address reception has been selected, the transmitter information is not added. The communication apparatus performs ring-type multiple-address transmission/reception of received image data; and the transmitter information is added to the received image data as the image data when the start of ring-type multiple address transmission has been selected.

According to still another aspect, the present invention which achieves the above-described object relates to a communication method performing ring-type multiple-address transmission, the method including the steps of storing received image data in a memory, registering a sub-address signal and a communication specification so as to correspond to a memory box, transferring the received image data stored in the memory, identifying whether or not the received image data is data assigned to be subjected to ring-type multiple-address processing, and causing the transferring step to transfer the received image data without adding transmitter information if the received image data is data assigned to be subjected to the ring-type multiple-address processing, and causing the transferring step to transfer the received image data with the transmitter information added thereto if the received image data is not data assigned to be subjected to the ring-type multiple-address processing, wherein the transmitter information is added to the received image data as the image data.

The foregoing and other objects, advantages and features of the present invention will become more apparent from the following description of the preferred embodiment taken in conjunction with the accompanying drawings.

BRIEF DESCRIPTION OF THE DRAWINGS

FIG. 2 is a diagram illustrating a specific example of data registered in a memory circuit in the facsimile apparatus shown in FIG. 1;

FIGS. 3A-3C are diagrams, each illustrating an example of an addition of transmitter information in the facsimile apparatus shown in FIG. 1; and FIGS. 4 through 9 are flowcharts, each illustrating the flow of an operation in the facsimile apparatus shown in FIG. 1.

DESCRIPTION OF THE PREFERRED EMBODIMENT

A preferred embodiment of the present invention will now be described illustrating a facsimile apparatus, with reference to the drawings.

Figure 1:
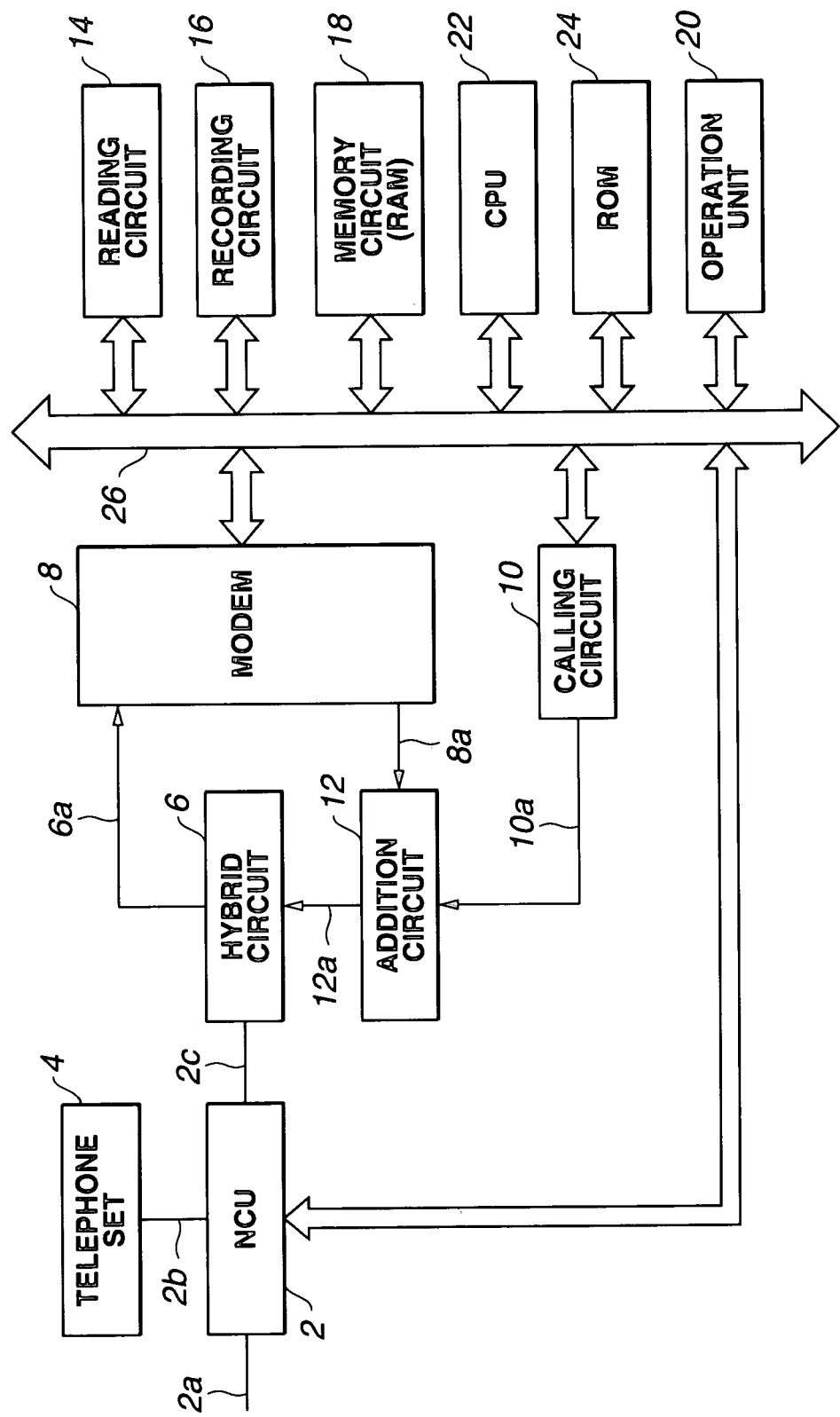
FIG. 1 is a block diagram illustrating the configuration of a facsimile apparatus according to an embodiment of the present invention.

FIG. 1 is a block diagram illustrating the configuration of a facsimile apparatus according to the preferred embodiment. In FIG. 1, an NCU (network control unit) 2 performs, for example, operations of connecting a telephone network to a terminal of a line, controlling connection of a telephone switched network, switching to a data communication channel, and maintaining a loop, in order to use the telephone network for data communication and the like. The NCU 2 also connects a telephone line 2a to a telephone set 4 (to be described later) in response to a control signal from a bus 26 (to be described later) (CML off), or connects the telephone line 2a to the facsimile apparatus side (CML on). In an ordinary state, the telephone line 2a is connected to the telephone set 4.

A hybrid circuit 6 separates a signal of a transmission system from a signal of a reception system, transmits a transmission signal from an addition circuit 12 (to be described later) to the telephone line 2a via the NCU 2, receives a signal from the communication partner from a signal line 2c via the NCU 2, and transmits the received signal to a MODEM (modulator-demodulator) 8 (to be described later) via a signal line 6a.

The MODEM 8 performs modulation/demodulation based on ITU-T (International Telecommunication Union-Telecommunication Standardization Sector) recommendation V.8, V.21, V.27, V.29, V.17 and V.34. Each transmission mode is assigned by a control signal from the bus 26. The MODEM 8 inputs a transmission signal from the bus 26, outputs modulated data to a signal line 8a, inputs a received signal output to the signal line 6a, and outputs demodulated data to the bus 26.

A calling circuit 10 inputs telephone-number information in response to a control signal from the bus 26, and outputs a DTMF (dual tone multi-frequency) selection signal to a signal line 10a. An addition circuit 12 inputs an information signal from the signal line 8a and an information signal from the signal line 10a, and outputs a signal indicating a result of addition of these information signals to a signal line 12a.

A reading circuit 14 outputs read data to the bus 26. A recording circuit 16 records an information signal output to the bus 26 sequentially in units of lines. A memory circuit 18 is used as a wording memory (a RAM (random access memory)), or as a memory for storing original information or encoded information relating to read data, received information, decoded information and the like via the bus 26. The memory circuit 18 also includes a memory for registering a sub-address signal and a communication specification so as to correspond to a memory box, as shown, for example, in FIG. 2, via the bus 26.

An operation unit 20 includes one-touch dials, abbreviation dials, a ten-digit keypad, * and # keys, a set key, a start key, a stop key, a key for selecting start of ring-type multiple-address transmission, a key for selecting transfer of information by ring-type multiple-address reception, a registration key for assigning registration to a memory box, and other function keys. Key information from each depressed key is output to the bus 26. The operation unit 20 also includes a display unit (not shown), which inputs an information signal output to the bus 26 and displays the input information.

A CPU (central processing unit) 22 controls the entire facsimile apparatus and executes a facsimile transmission control procedure. A control program for this procedure is stored in a ROM 24 (read-only memory, to be described later). The bus 26 interconnects the respective components.

The CPU 22 includes registration means for registering a sub-address signal and a communication specification so as to correspond to a memory box, ring-type multiple-address transmission start selection means, ring-type multiple-address reception transfer selection means, and control means for performing control so that, when start of ring-type multiple-address transmission has been selected, transmitter information is added, and when transfer of ring-type multiple-address reception has been selected, transmitter information is not added.

When start of ring-type multiple-address transmission has been selected, transmitter information is added. In the case of ring-type multiple-address reception/transfer, transmitter information is not added. When start of ring-type multiple-address transmission has been selected, information indicating ring-type multiple-address transmission and information indicating the nickname of the transmitted information are added as transmitter information. When a sub-address signal and a transfer of a predetermined address as a communication specification are registered so as to correspond to a memory box, if the registered sub-address signal is received, receiver information is added, and received information is transferred to the predetermined address.

A control program for the above-described control is stored in the ROM 24.

The above-described information indicating a nickname is, for example, "PTA circular".

FIGS. 3A-3C illustrate specific examples of transmitter information.

FIG. 3A illustrates a case of selecting start of ring-type multiple-address transmission at the transmitter's apparatus. For example, transmitter information "ring-type multiple-address transmission (PTA circular) 03-3111-2222 P1" is transmitted, followed by information relating to an original. The transmitter information is transmitted for each page.

FIG. 3B illustrates a case of transferring ring-type multiple-address reception information. In this case, ring-type multiple-address reception information received in the memory is transmitted in its original form without adding transmitter information.

FIG. 3C illustrates a case of performing transfer to a predetermined address corresponding to a memory box. For example, transmitter information "03-3111-2222 P1" is transmitted, followed by transmission of transferred information received and stored in the memory. The transmitter information is transmitted for each page.

Next, a description will be provided of operations of the facsimile apparatus according to the embodiment, with reference to the flowcharts shown in FIGS. 4 through 9.

Figure 4:
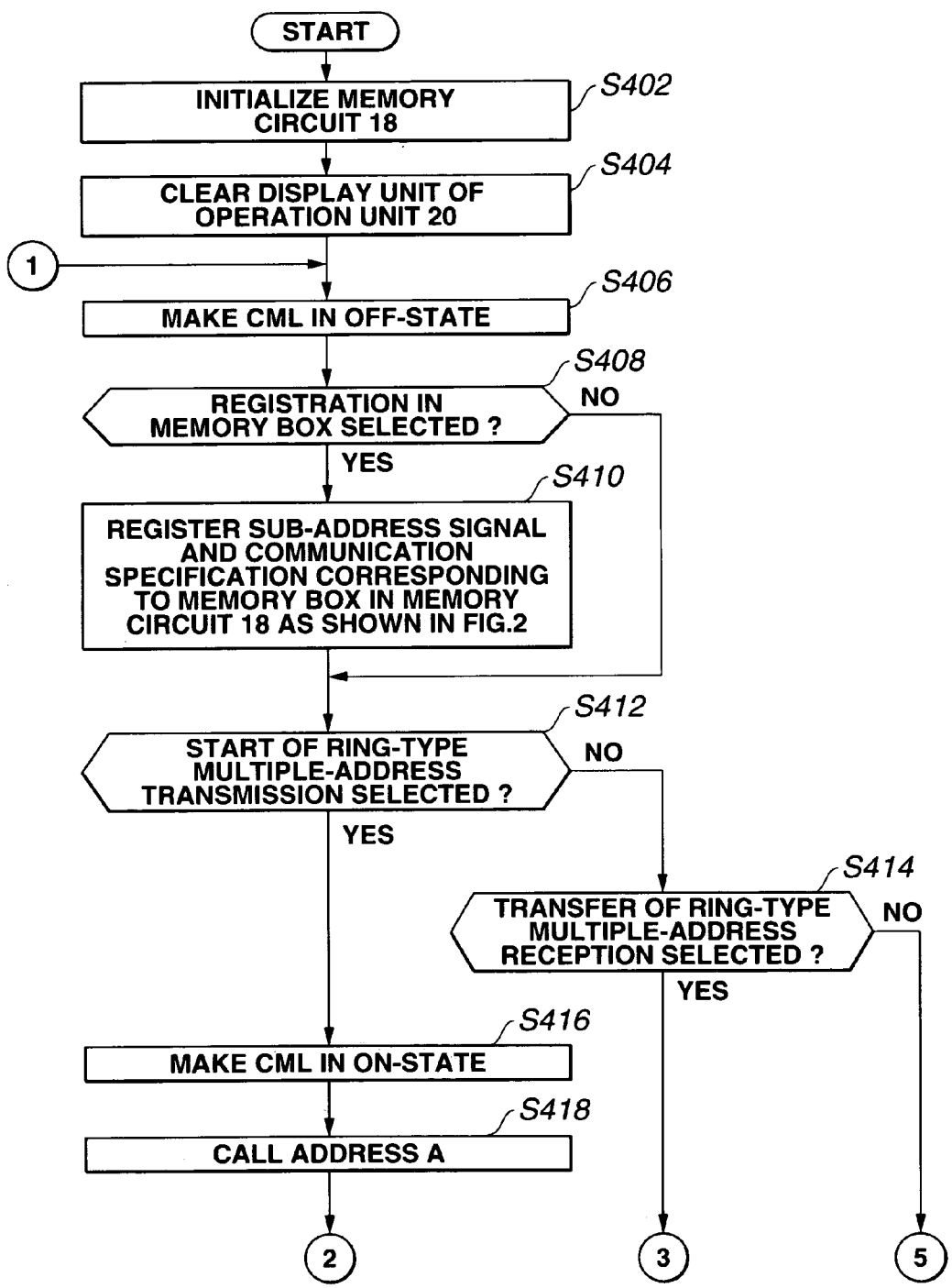

In FIG. 4, in step S402, the memory circuit 18 is initialized via the bus 26. Then, in step S404, the display unit of the operation unit 20 is cleared via the bus 26. Then, in step S406, CML of the NCU 2 is made in an off-state. Then, in step S408, information from the operation unit 20 is input via the bus 26, and it is determined if registration in a memory box has been selected.

If the result of the determination in step S408 is affirmative, the process proceeds to step S410, where a sub-address signal and a communication specification corresponding to the memory box of the memory circuit 18 are registered, as shown in FIG. 2, via the bus 26, and the process proceeds to step S412. If the result of the determination in step S408 is negative, the process proceeds to step S412 by skipping step S410.

In step S412, information from the operation unit 20 is input via the bus 26, and it is determined if start of ring-type multiple-address transmission has been selected.

If the result of the determination in step S412 is negative, the process proceeds to step S414, where information from the operation unit 20 is input via the bus 26, and it is determined if transfer of ring-type multiple-address reception has been selected.

Figure 6:
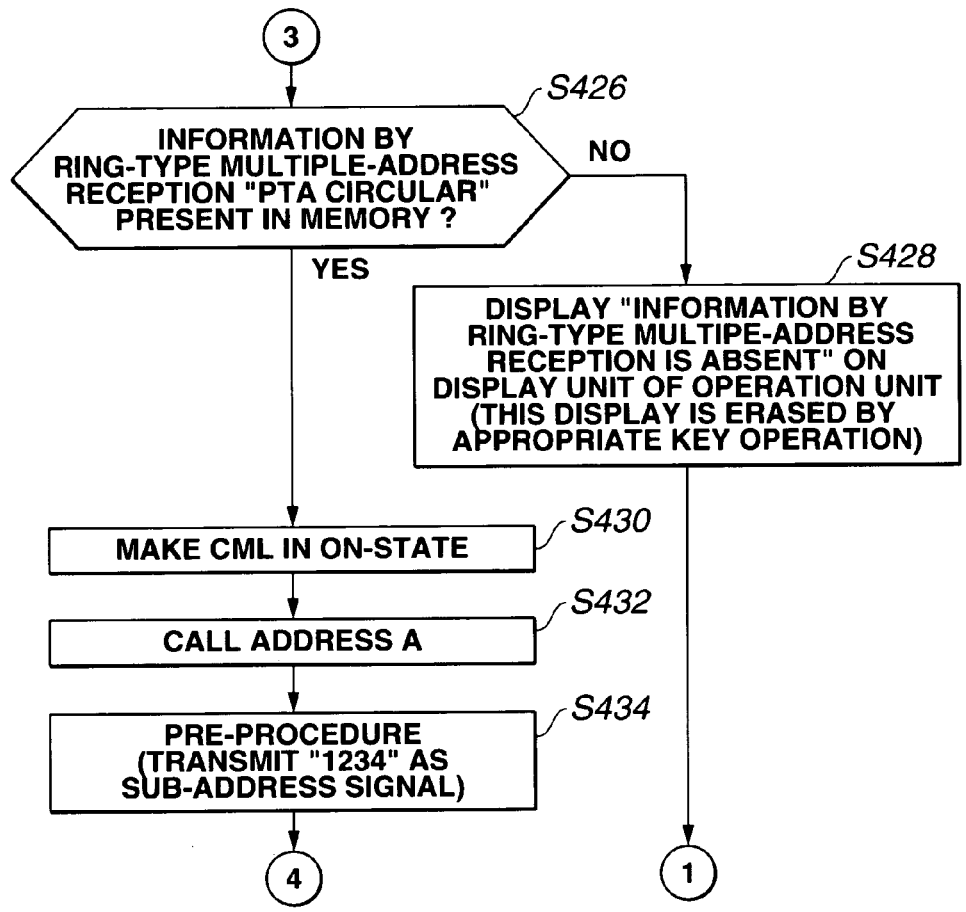

If the result of the determination in step S414 is affirmative, the process proceeds to step S426 shown in FIG. 6. If the result of the determination in step S414 is negative, the process proceeds to step S440 shown in FIG. 8.

If the result of the determination in step S412 is affirmative, the process proceeds to step S416, where CML of the NCU 2 is made in an on-state via the bus 26. Then, the process proceeds to step S418, where address A is called using the calling circuit 10 via the bus 26, and the process then proceeds to step S420 shown in FIG. 5.

Figure 5:
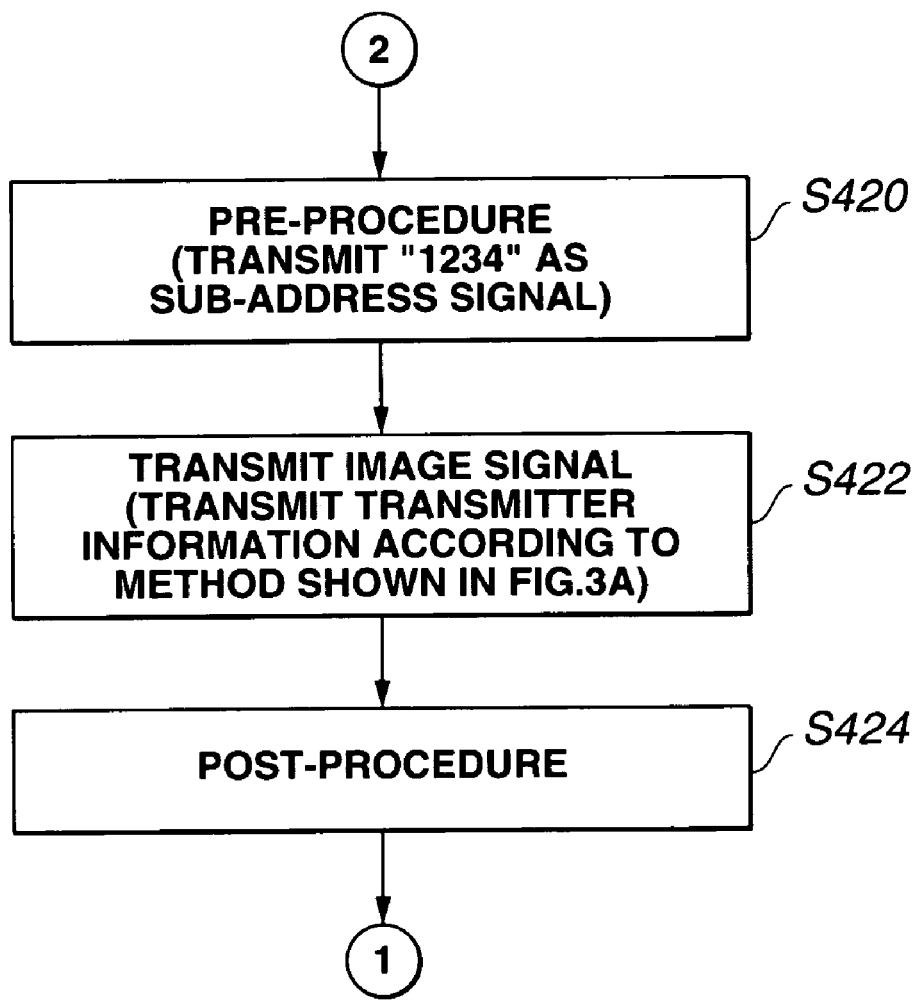

In FIG. 5, in step S420, a pre-procedure is executed. In this embodiment, "1234" is transmitted as a sub-address signal. Then, in step S422, an image signal is transmitted. In this case, transmitter information is transmitted according to the method shown in FIG. 3A. Then, in step S424, a post-procedure is executed, and the process then returns to the above-described step S406 shown in FIG. 4.

In FIG. 6, in step S426, it is determined if information by ring-type multiple-address reception "PTA circular" is present in the memory circuit 18.

If the result of the determination in step S426 is negative, the process proceeds to step S428, where a message "Information by ring-type multiple-address reception is absent" is displayed on the display unit of the operation unit 20 via the bus 26, and the process then returns to the above-described step S406 shown in FIG. 4.

The contents of the display in step S428 are erased according to an appropriate key operation.

If the result of the determination in step S426 is affirmative, the process proceeds to step S430, where CML of the NCU 2 is made in an on-state via the bus 26. Then, in step S432, address A is called using the calling circuit 10 via the bus 26. Then, in step S434, a pre-procedure is executed. In this case, "1234" is transmitted as a sub-address signal. After executing the processing of step S434, the process proceeds to step S436 shown in FIG. 7.

Figure 7:
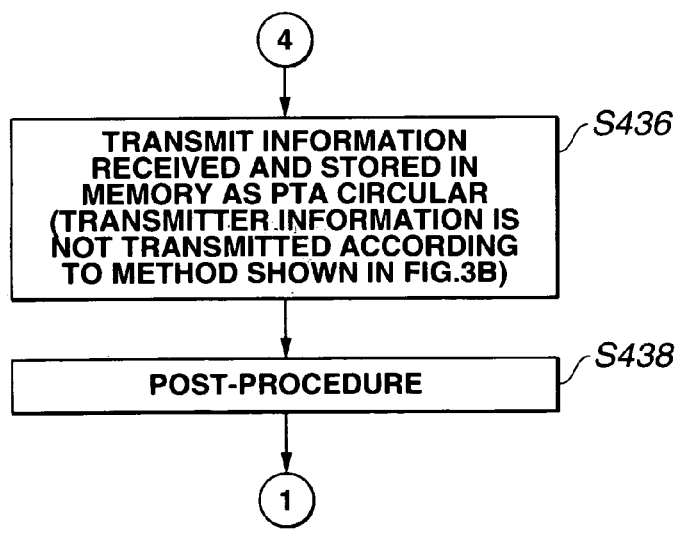

In FIG. 7, in step S436, the information received and stored in the memory as "PTA circular" is transmitted. In this case, transmitter information is not transmitted according to the method shown in FIG. 3B. Then, in step S438, a post-procedure is executed, and the process then returns to the above-described step S406 shown in FIG. 4.

In FIG. 8, in step S440, it is determined if facsimile reception has been selected.

If the result of the determination in step S440 is negative, the process proceeds to step S442, where other processing is executed, and the process then returns to the above-described step S406 shown in FIG. 4.

If the result of the determination in step S440 is affirmative, the process proceeds to step S444, where CML of the NCU 2 is made in an on-state via the bus 26. Then, in step S446, a pre-procedure is executed. In this case, "possession of a function of receiving a sub-address signal" is notified.

Then, in step S448, it is determined if a sub-address signal has been received.

If the result of the determination in step S448 is negative, the process proceeds to step S450, where reception/recording of an image signal is performed. Then, in step S452, a post-procedure is executed, and the process then returns to the above-described step S406 shown in FIG. 4.

If the result of the determination in step S448 is affirmative, the process proceeds to step S454 shown in FIG. 9.

In FIG. 9, in step S454, it is determined if the sub-address signal is "1234".

If the result of the determination in step S454 is affirmative, the process proceeds to step S456, where memory reception is performed as "PTA circular". Then, in step S458, a post-procedure is performed, and the process then returns to the above-described step S406 shown in FIG. 4.

If the result of the determination in step S454 is negative, the process proceeds to step S460, where it is determined if the sub-address signal is "5678".

If the result of the determination in step S460 is negative, the process proceeds to step S462, where communication control corresponding to the received sub-address signal is executed, and the process then returns to the above-described step S406 shown in FIG. 4.

If the result of the determination in step S460 is affirmative, the process proceeds to step S464, where ring-type multiple-address transmission is received. Then, in step S466, a post-procedure is executed. Then, in step S468, CML of the NCU 2 is made in an off-state via the bus 26. Then, in step S470, waiting is performed for one minute. Then, in step S472, CML of the NCU 2 is made in an on-state via the bus 26.

Then, in step S474, address B is called using the calling circuit 10 via the bus 26. Then, in step S476, a pre-procedure is executed. In this step, a sub-address signal is not transmitted. Then, in step S478, information just received and stored in the memory is transmitted. In this step, transmitter information is transmitted according to the method shown in FIG. 3C. Then, in step S480, a post-procedure is executed, and the process then returns to the above-described step S406 shown in FIG. 4.

As described above in detail, according to the communication apparatus of the present invention, when executing ring-type multiple-address transmission, information relating to a transmitter starting the ring-type multiple-address transmission, information indicating the ring-type multiple-address transmission, and information indicating the nickname of the transmitted information can be transmitted. When transferring ring-type multiple-address reception, transmitter information is not added. Hence, the user of each facsimile apparatus performing ring-type multiple-address transmission can know that the received information has been transmitted according to ring-type multiple-address transmission, and the person starting the ring-type multiple-address transmission. Furthermore, even when recording received information on a cut recording sheet, the received information is not recorded in a state of being divided into two pages, and therefore the apparatus is very easy to use.

According to the communication apparatus of the present invention, when transfer of received information is assigned by a sub-address signal not indicating ring-type multiple-address transmission, transmitter information is added. In this case, since transfer is not performed a plurality of times, received information is not recorded by being divided into two pages. Hence, the receiver of the transferred information can recognize the transmitter of the information, and therefore the apparatus is very easy to use.

The individual components shown in outline or designated by blocks in the drawings are all well known in the communication apparatus arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A communication apparatus adapted to perform ring-type multiple-address transmission, said apparatus comprising:
   a memory, arranged to store image data;
   a reception unit, arranged to receive image data and store the received image data to said memory;
   a transmission unit, arranged to transmit the received image data stored in said memory;
   an identification unit, arranged to identify whether or not the received image data is data assigned to be subjected to ring-type multiple-address transfer; and
   a processor arranged to add transmitter information to the received image data and to cause the transmission of the received image data with the transmitter information added thereto when said apparatus is being used as a transmitter when a start of ring-type multiple-address transfer is selected, or to cause the transmission of the received image data without the transmitter information added thereto when said apparatus is being used as a repeater station when a transfer of ring-type multiple-address transfer is selected,
   wherein the transmitter information provides information identifying the received image data.

2. A communication method performing ring-type multiple-address transmission, said method comprising the steps of:
   storing image data in a memory;
   receiving image data and storing the received image data to the memory;
   transmitting the received image data stored in the memory;
   identifying whether or not the received image data is data assigned to be subjected to ring-type multiple-address transfer; and
   transmitting the received image data with transmitter information added thereto when the apparatus is being used as a transmitter when a start of ring-type multiple-address transfer is selected, or transmitting the received image data without the transmitter information added thereto when the apparatus is being used as a repeater station when a transfer of ring-type multiple-address transfer is selected,
   wherein the transmitter information provides information identifying the received image data.

* * * * *

UNITED STATES PATENT AND TRADEMARK OFFICE
CERTIFICATE OF CORRECTION

PATENT NO. : 7,245,390 B1  
APPLICATION NO. : 09/617234  
DATED : July 17, 2007  
INVENTOR(S) : Takehiro Yoshida Page 1 of 1

It is certified that error appears in the above-identified patent and that said Letters Patent is hereby corrected as shown below:

ON THE TITLE PAGE, ITEM [30]:

Foreign Application Priority Data, "1999/206096" should read -- 11-206096 --.

Signed and Sealed this

Twenty-seventh Day of May, 2008

JON W. DUDAS  
*Director of the United States Patent and Trademark Office*